United States Patent [19]

Kohno

[11] Patent Number: 4,942,512
[45] Date of Patent: Jul. 17, 1990

[54] CONTROL METHOD OF ROBOT SYSTEM AND APPARATUS FOR REALIZING THE SAME

[75] Inventor: Yoshiaki Kohno, Yokohama, Japan

[73] Assignee: Kabushiki Kaisha Toshiba, Kawasaki, Japan

[21] Appl. No.: 196,063

[22] Filed: May 19, 1988

[30] Foreign Application Priority Data

May 21, 1987 [JP] Japan ................. 62-124604

[51] Int. Cl.$^5$ .................................................. G06F 3/04
[52] U.S. Cl. .................... 364/133; 364/138;
364/513; 364/200; 364/228.5; 364/239;
364/244.3; 364/254.5
[58] Field of Search ....................... 364/131–133,
364/138, 468, 478, 513, 200, 900

[56] References Cited

U.S. PATENT DOCUMENTS

| | | | |
|---|---|---|---|
| 4,428,043 | 1/1984 | Catiller et al. | 364/200 |
| 4,600,988 | 7/1986 | Tendulker et al. | 364/131 |
| 4,607,256 | 8/1986 | Henzel | 364/186 |
| 4,658,351 | 4/1987 | Teng | 364/200 |
| 4,706,120 | 11/1987 | Slaughter et al. | 364/513 |

FOREIGN PATENT DOCUMENTS

| | | |
|---|---|---|
| 0022622 | 6/1980 | European Pat. Off. . |
| 0090302 | 3/1982 | European Pat. Off. . |
| 0162670 | 5/1985 | European Pat. Off. . |
| 0201081 | 5/1985 | European Pat. Off. . |
| 60-256875 | 12/1985 | Japan . |
| 61-117605 | 5/1986 | Japan . |
| 8301520 | 3/1983 | World Int. Prop. O. . |

OTHER PUBLICATIONS

T. Tanaka, et al., Robot Planner: Design and Programming support System for Planning of Robot Operation–Basic concept and Development–Toshiba Corporation, pp. cover (v), 283–286.
"Proposal of Mark Flow Graph for Discrete System Contol", (in Japan) Trans of SICE, 2-2; K. Hasegawa, et al., 1983, This article proposes a concept of Mark Flow Graph (a kind of directed graph which can represent control logic for sequential control systems).
"A Petri net based Controller for Flexible and Maintainable Sequence Control and its Application in Factory Automation", IEEE Trans. Industrial electronics IE-33.1; T. Murata, et al.; 1986, This article proposes a new type controller based on a Petri Net (a kind of directed graph) like control language.
Proc. IECON'86; M. Nagata; 1986, IEEE "Interprocess Communication for Robot Control".

Primary Examiner—John R. Lastova
Attorney, Agent, or Firm—Cushman, Darby & Cushman

[57] ABSTRACT

When a robot system has a program module group within a central control unit for performing required program processing, the associated portions of the robot, and a plurality of peripheral control modules for controlling the associated portions of the robot, a communication module is provided to perform communication between the modules. In the system there is provided with a queue buffer for sequentially storing the present status information, a source module name, and the message. The communication module monitors transmission from the respective module, stores a message in the queue buffer, forms a transmit request list, sequentially receives the destination module name and the message in accordance with a reception procedure of the source module, and stores the source name module and the message in the queue buffer in accordance with the destination module. Subsequently, the communciation module sequentially searches the message to be transmitted in a queue buffer, and checks the status of the destination modules. If the status of a destination module is set in an enabled state, the message is transmitted in accordance with a transmission procedure of the destination module. If not, the message is left in the queue list and will be transmitted in the next transmission cycle.

9 Claims, 3 Drawing Sheets

FIG. 3

| STATUS | S.M. | MES. | S.M. | MES. | S.M. | MES. | S.M. | MES. | S.M. | MES. | 39-36 |
| STATUS | S.M. | MES. | S.M. | MES. | S.M. | MES. | S.M. | MES. | S.M. | MES. | 39-17 |
| STATUS | S.M. | MES. | S.M. | MES. | S.M. | MES. | S.M. | MES. | S.M. | MES. | 39-16 |

CONTROL METHOD OF ROBOT SYSTEM AND APPARATUS FOR REALIZING THE SAME

U.S. application Ser. No. 07/196.061 filed May 19, 1988 and U.S. application Ser. No. 97/196.063 filed May 19, 1988 are related applications.

BACKGROUND OF THE INVENTION

1. Field of the Invention

The present invention relates to a robot system having a central control unit for managing the entire operation of the robot system and a plurality of peripheral control modules for controlling the operations of the respective portions of the robot. More particularly, the present invention relates to a communication control method of transmitting operation information among program modules of the central control unit, among control modules, and between the program modules and the control modules; and an apparatus for realizing the method.

b 2. Description of the Related Art

Generally, along with widening in application range, both the mechanism and control systems of industrial robots have become complicated. Regarding the control system, it is divided into peripheral control modules for controlling the respective portions of the mechanism and signal processing and a central control unit for managing and controlling the entire operation.

Conventional industrial robots operate in accordance with a permanent work program. The peripheral equipment such as a sensor belongs to the robot controller and performs input/output of a simple signal in response to a communication instruction incorporated in the robot language.

In the conventional robot system, no serious problems occur when the robot performs a comparatively simple operation. However, when the robot system is a so-called multifunction system, it has a plurality of peripheral control modules for independently controlling the respective portions of the robot. It also includes in the central control unit a plurality of program modules, which can concurrently be performed to exchange instruction signals between any two of the control modules and the program modules. In such a multifunction system, the following problems arise.

Each peripheral control module and each program module of the central control unit must have a work program that can cope with any possible situation. As a result, when the operation of the robot system is changed, or when the operation sequence of each control module is changed, a new work program must be created.

Since the respective portions of the robot are controlled using instructions having simple contents, it is difficult for the robot to have a complicated function.

When a certain operation is instructed to a robot section and completion of the instructed operation is awaited, the central control unit and each program module must monitor a signal transmitted from the corresponding robot section in a program manner, and other program processes cannot be performed during this monitoring.

Furthermore, when each program processing module of the central control unit independently and parallelly processes the program, it cannot control a corresponding control module immediately based on the processing result if other processing modules use the communication line.

SUMMARY OF THE INVENTION

The present invention has been made in view of the above situation and has as its object to provide a communication control method of a robot system wherein when the arrangement of control modules is changed, a communication control can be performed without changing the program of each program module, when a new function is added to the robot, the method can sufficiently cope with it, and the operation of the respective portions of the robot can appropriately reflect the processing state, and a request of each module. The present invention also provides an apparatus for realizing the method.

The robot system according to the present invention comprises a plurality of program modules each for independently performing required program processing in the central control unit, a robot mechanism, and a plurality of control modules for controlling associated portions of the robot mechanism. In the robot system, communication is performed among program modules, among the control modules, and between the program modules and the peripheral control modules. For this purpose, in the present invention, a communication module is provided for performing communication management. Each module includes a data base on the connection style for communication with another module, a status buffer and a queue buffer for the modules. The status buffer stores the current status information of each module and the queue buffer sequentially stores the names of source modules, each of which has sent a message to a destination module, and stores the message itself.

When a certain message is to be transmitted from one module to another, the destination module name and the message are transmitted to the communication module. The communication module alternately monitors messages transmitted from modules within the system, and the state of the queue buffer. When a message is transmitted, the destination module name and the message are read in accordance with a reception procedure of the source module described in the connection style data base. Then, the source module name and the message are stored in the queue buffer of the destination module. The stored message is monitored and found in the queue buffer. When the status of the destination module is in the enabled state, the source module name and the message are transmitted to the destination module in accordance with the transfer procedure described in the connection style data base.

In this manner, according to the present invention, even if the arrangement of the control modules or program modules is altered, the control method can cope with it by altering the communication transfer status data base of the communication module. The message arrival order to a specific module is maintained at the reception order of the communication module by the queue. Therefore, even when a new function is added to the robot, the control method can sufficiently cope with it, and the respective portions of the robot can appropriately reflect the program processing state and request of each module.

BRIEF DESCRIPTION OF THE DRAWINGS

FIG. 3 shows the arrangement of a queue buffer used for communication control.

DETAILED DESCRIPTION OF THE PREFERRED EMBODIMENTS

A robot system according to a preferred embodiment of the present invention will be described in detail with reference to the accompanying drawings.

Figure 1:
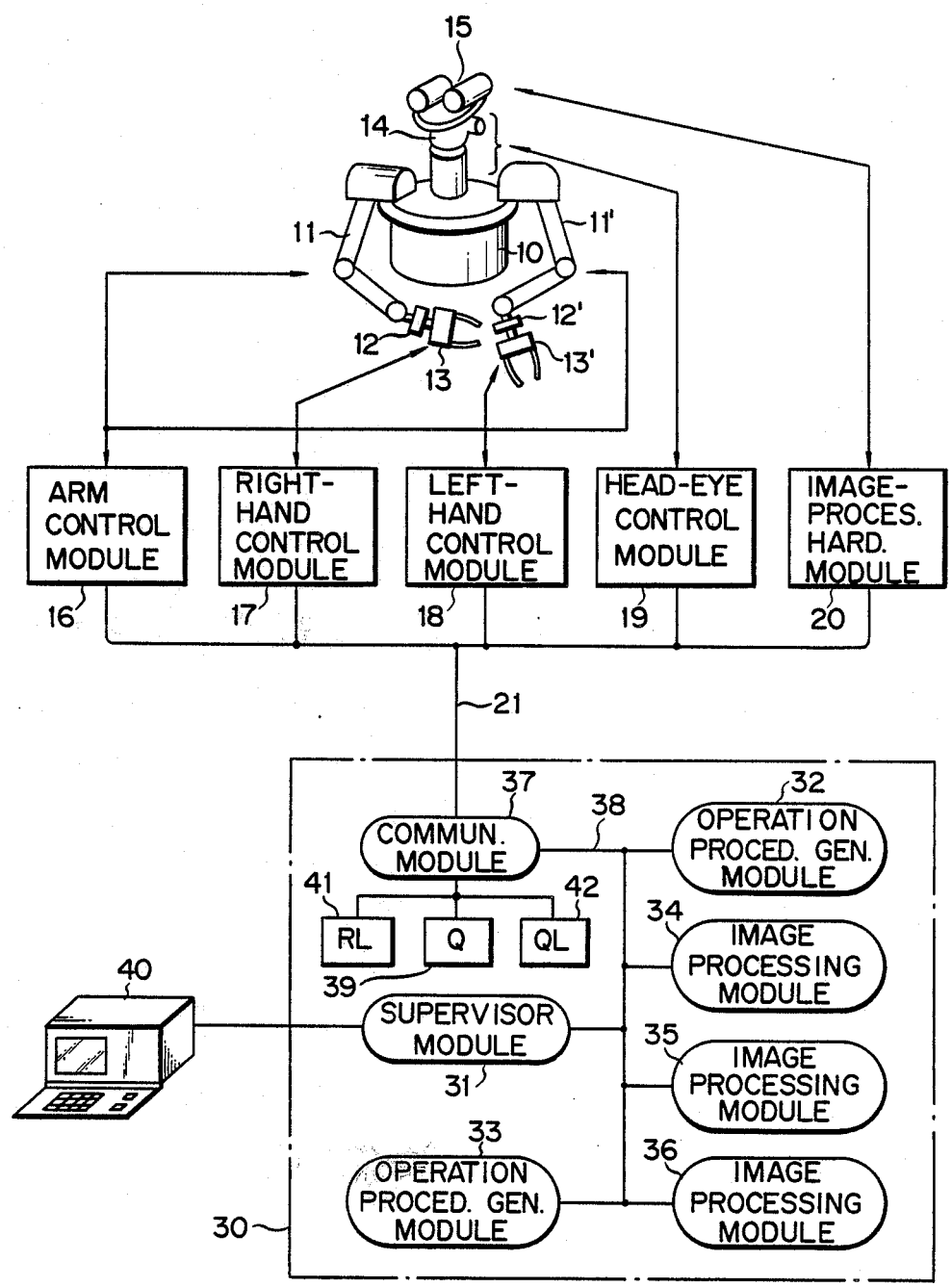
FIG. 1 is a block diagram of a multifunction robot system according to an embodiment of the present invention.

FIG. 1 shows the arrangement of a robot system according to an embodiment of the present invention. Referring to FIG. 1, the robot system has, e.g., 7-degree-of-freedom arms 11 and 11', 6-degree-of-freedom dynamic amount measuring sensors 12 and 12', and 4-degree-of-freedom hands 13 and 13'. Stereo camera 15 for obtaining visual information is provided above robot main body 10 through neck 14. Arm control module 16 controls arms 11 and 11' in accordance with an arm control instruction. Right and left hand control modules 17 and 18 control hands 13 and 13' in accordance with right and left hand control instructions, respectively. Head-eye control module 19 controls swing of neck 14 in accordance with input control instructions. Image proccesing hardware module 20 fetches image data in accordance with an input control instruction and transmits it. These peripheral control modules 16 to 20 respectively have a function to transmit and receive data.

Central control unit 30 for managing the operation of the overall robot system is connected to terminal 40 and control modules 16 to 20 through external communication line 21. Terminal 40 displays the processing results of respective control modules 16 to 20 and the processing results of the respective program modules 31 to 37 of control unit 30. Necessary information is entered as required from terminal 40 by an operator.

Central control unit 30 has supervisor module 31, work procedure generation modules 32 and 33, image processing modules 34 to 36, and communication module 37. Module 31 sends various control instructions to modules 16 to 20 and 32 and 33 to progress the overall operations. Work procedure generation modules 32 and 33 and image processing modules 34 to 36 serve as follows. Module 32 generates the parts assembly sequence from the structure of an assembly sample. Module 33 determines the operation sequences and operation amounts of the respective portions of the robot based on the parts assembly sequence. Module 34 fetches images of the assembly sample and estimates its structure. Module 35 detects a correction amount of a hand when a part is to be gripped. Module 36 detects relative positions of parts when they are to be assembled. Communication module 37 is connected to program modules 31 to 36 through internal communication system 38, and enables bidirectional communication among modules 31 to 36 in central control unit 30, among control modules 16 to 20, and between modules 31 to 36 and modules 16 to 20.

Communication program module 37 is connected to transmission request list 41, queue buffer 39, and queue list 42. Buffer 39 has queue areas 39-16, 39-17, ..., and 39-36 corresponding to respective modules 16 to 36, as shown in FIG. 3. Each area sequentially stores a source module name (S.M.) and a message (MES.). The status of the module is also stored. When a transmission request is supplied, a number assigned to the module that has generated the transmission request is written in list 41. The number can be an identifier such as a module name. List 42 indicates whether a message is stored in each area of buffer 39 by means of 1 bit, i.e., 1 or 0. The number of messages stored in each area can be written in list 42 instead of 1 or 0 to indicate the presence of messages.

Figure 2:
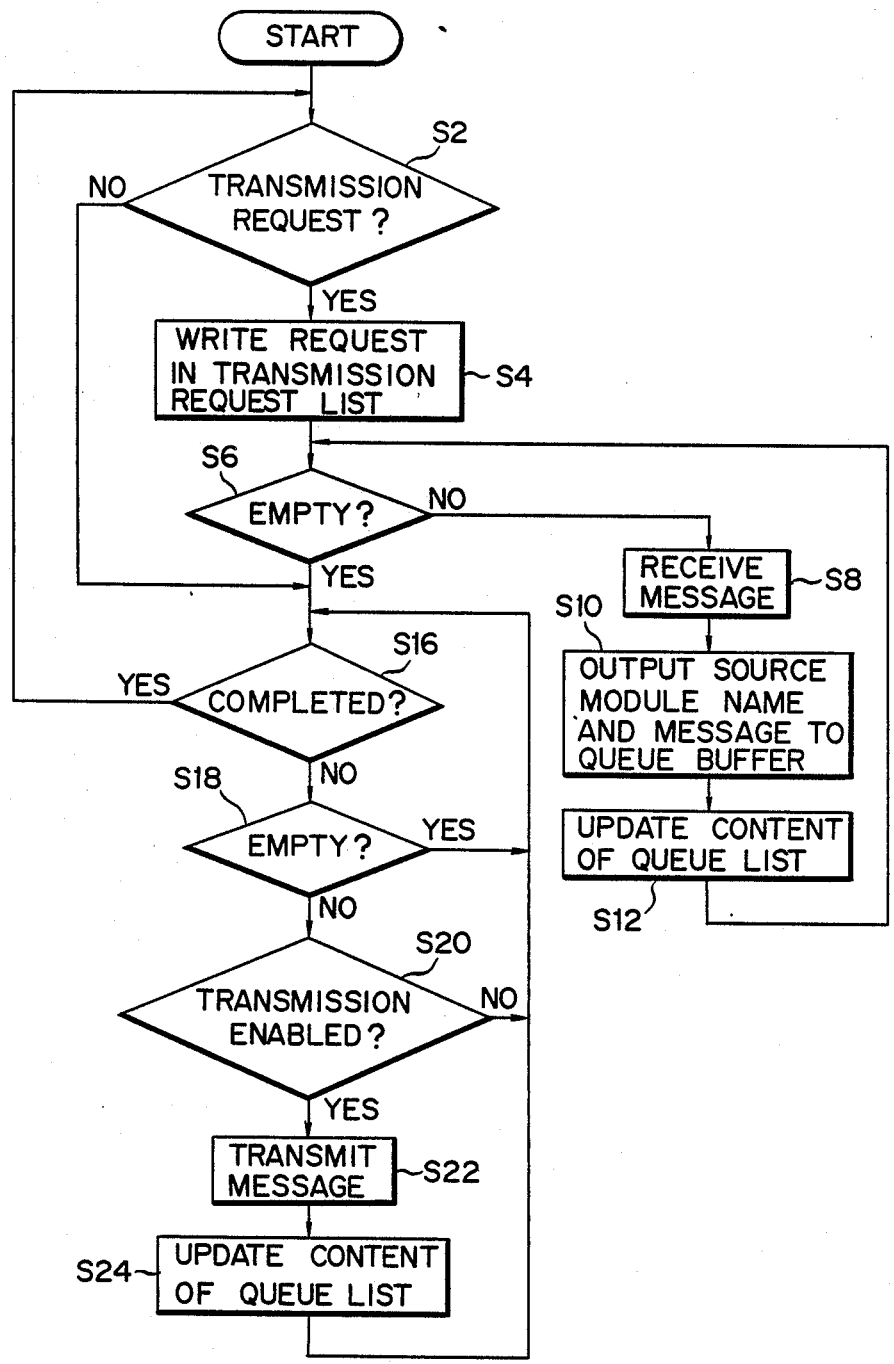
FIG. 2 is a flowchart for explaining the operation of an intermodule communication control module.

The operation of the robot system having the above arrangement will be described with reference to FIG. 2.

In step S2 module 37 monitors a transmission request from modules 16 to 20 and 31 to 36. If no transmission request is supplied, i.e., if NO in step S2, step S16 is executed. However, if YES in step S2, i.e., if a transmission request is supplied from e.g., module 16 to module 32 and from module 32 to module 17, numbers assigned to modules 16 and 32 are written in transmission request list 41 in step S4.

In step S6, it is checked whether transmission request list 41 is empty. If NO in step S6, step S8 is executed, and the numbers stored in list 41 are read out starting from the head of list 41. In step S10, data is output from a module identified by its number, i.e., module 16 in this example. The data includes a destination module name and a message. A source module name is discriminated from the assigned number. The source module name and received message are written in area 39-32 of queue buffer 39 in accordance with the destination module name. In this case, when a message to be transmitted is already written in area 39-32, the source module name and message are written after it. Therefore, necessary data can be stored in buffer 39 while designating an appropriate destination module among modules 16 to 20 and 31 to 36. Then, queue list 42 is updated to include a message corresponding to module 32 in step S12.

Then, step S6 is executed again. Since a transmission request supplied from module 32 is present in transmission request list 41, steps S8 to S12 are repeated in the same manner as described above.

When it is determined in step S6 that transmission request list 41 is empty, step S16 is executed, and it is checked from queue list 42 whether a message to be transmitted is present in queue buffer 39. If a message to be transmitted is present in buffer 39, it is output from buffer 39 to a corresponding module in a predetermined order. In this example, the order is module 16-20 and then module 31-36.

In step S18, it is first checked from queue list 41 whether a message destined to module 16 is present. If there is no such message, the same check is performed for module 17. If there is such a message, it is checked in step S20 whether destination module 17 is in an enabled state from the status written in area 39-17 of queue buffer 39. If NO in step S20, the flow returns to step S16.

Assume that the processing for each destination module has progressed and that checking is to be performed for module 32 in step S18. A message destined to module 32 has been received in advance and written in queue buffer 39. Thus, NO is obtained in step S18 and it is checked in step S20 whether module 32 is in the enabled state. If YES in step S20, the message and the source module name that are read out from buffer 39 are transmitted to module 32 together with a destination module name in step S22. Then, queue list 42 is updated in step S24 and step S16 is executed. In this manner, a message is transmitted only once to each destination module. When a module status change occurs, the enable/disable state of a corresponding one of modules 16 to 20 and 31 to 36 is updated by transmitting the changed module state to the status of queue buffer 39 through module 37.

When the flow returns to step S2 from step S16, if no transmission request is generated, steps S16 to S24 are executed and a message is transmitted only once to each destination module.

In the embodiment described above, the transmission and reception sequences of each module can be kept unchanged. Since mutual communication among the respective modules is performed through module 37, the physical state of a destination module need not be considered, the entire arrangement can be simplified, and the flexibility of each module can be improved. Even when the system arrangement or the operating state is changed, only the program of module 37 need be modified and the information transmission path need not be modified. Modules 16 to 20 and 31 to 36 need not monitor the communication line, resulting in a simplified program. The same or different operation instructions can be supplied to a plurality of modules at once, and thus the parallel operations of the respective portions of the robot can be executed.

When the program modules are increased in size, a plurality of central control units can be coupled through a communication module and an increase in communicational complexity can be prevented. Moreover, various changes and modifications can be made within the spirit and scope of the invention.

What is claimed is:

1. A method for controlling a robot system having a commander and a plurality of modules, comprising the steps of:
   generating one or more requests to transmit one or more messages from a source module to a destination module;
   inputting the transmission requests to the commander;
   placing the transmission requests into a sequential list of transmission requests;
   writing the messages into queue buffers, corresponding to the destination modules, until the sequential list is depleted; and
   transmitting one messages from each of the queue buffers to the corresponding destination modules in a predetermined order.

2. A method according to claim 1, further including the step, after the step of transmitting, of:
   repeating the steps of generating, inputting, placing, writing, and transmitting.

3. A method according to claim 2, further including:
   after the step of placing, generating a status list identifying the status of each queue buffer as either containing at least one message or containing no message; and
   during the step of writing, checking the status list and placing messages in queue buffers, which already contain one or more messages, in sequential order.

4. A method according to claim 1, wherein the step of generating is performed in accordance with a work procedure for the robot system.

5. A method according to claim 1, wherein the step of transmitting includes:
   checking whether a destination module is busy; and
   transmitting the message from the queue buffer corresponding to the destination module only if the destination module is not busy.

6. A robot system, comprising:
   a plurality of modules, each module capable of acting as a source module of a message and as a destination module of a message, each module including means for generating transmission requests and for generating messages to be sent to other modules, and
   a commander in communication with the plurality of modules, including:
   means for receiving the transmission requests and messages from the modules,
   a sequential list memory for storing the received transmission requests in sequential order,
   a plurality of queue buffers, corresponding to the plurality of modules, capable of storing the messages to be sent to particular destination modules in the buffers corresponding to the particular destination modules, and
   means for transmitting one messages from each of the queue buffers to the destination modules corresponding to the queue buffers, in a predetermined order.

7. A system according to claim 6, wherein the commander further includes:
   means for determining whether a particular queue buffer contains a previous message and, if a queue buffer contains a previous message, for placing a subsequent message in the queue buffer with the previous message, in sequential order.

8. A system according to claim 6, wherein each module further includes means for generating messages in accordance with a work procedure for the robot system.

9. A system according to claim 6, wherein the commander further includes:
   means for determining whether a destination module is busy; and
   means for transmitting a message to a particular destination module only if the particular destination module is not busy.

* * * * *